March 28, 1967     C. J. KOESTER     3,311,845
Q-SWITCHING APPARATUS FOR A LASER DEVICE
Filed June 10, 1963     2 Sheets-Sheet 1

INVENTOR.
Charles J. Koester
BY John A. Harvey
Attorney

March 28, 1967 C. J. KOESTER 3,311,845
Q-SWITCHING APPARATUS FOR A LASER DEVICE
Filed June 10, 1963 2 Sheets-Sheet 2

INVENTOR.
Charles J. Koester
BY John A. Harvey
Attorney

United States Patent Office 3,311,845
Patented Mar. 28, 1967

3,311,845
Q-SWITCHING APPARATUS FOR A LASER DEVICE
Charles J. Koester, South Woodstock, Conn., assignor to American Optical Company, Southbridge, Mass.
Filed June 10, 1963, Ser. No. 286,808
6 Claims. (Cl. 331—94.5)

This invention relates to laser structures, and in particular to resonant laser structures of the type wherein energy-loss factors can be varied to control or modulate the laser light output.

Lasers are devices for producing coherent, monochromatic light of very high intensity and narrow beam spread. A typical laser structure includes a body of laser material arranged within a resonant cavity defined between opposed internally reflective surfaces at least one of which may be partially light-transmissive. Light is produced in the laser by photonic emission occurring incident to the transition of active atoms in the laser body from an excited, upper energy level to a terminal low energy level.

By way of specific illustration, to initiate laser operation in a conventional solid-state laser device the laser body is pumped with an input pulse of light energy of appropriate absorptive wavelength. The pumping light excites active atoms in the body to shift from an initial low energy level to the aforementioned upper level through a series of interlevel transitions, with the result that the population of upper-level atoms in the body becomes greater than the remaining lower-level population, a condition termed an inversion of energy states. Light emitted by spontaneous emissive transitions of individual upper-level atoms in the body then reflects back and forth through the body between the cavity ends, and induces similar light-emissive transitions of other upper-level atoms in such manner as to create a fast-rising bidirectionally reflected pulse of coherent light in the cavity. A portion of this pulse emerges through the partially transmissive cavity end to constitute the laser light output.

Such light emission occurs when the difference between the upper-level population and the lower-level population in the laser body equals or exceeds a so-called threshold value, which is directly related to the total magnitude of energy-loss factors in the resonant cavity structure. Accordingly, the pumping energy input to the body must be sufficient to establish a degree of inversion therein equal to or greater than the threshold value. Once the latter condition is established, laser action producing one or a succession of output light pulses ordinarily continues until the degree of inversion in the body falls again below the threshold value due to depletion of the upper-level population by light-emissive transitions of upper-level atoms.

Since the threshold value of inversion requisite for laser action depends on the energy-loss factors in the cavity, the initiation and duration of the laser light output can be controlled by varying the total magnitude of these factors. Specifically, an increase in energy-loss factors at the outset of the pumping period can raise the threshold requirement of the cavity so as to prevent or delay the initiation of laser action notwithstanding the establishment of a relatively large degree of inversion by the pumping light input. Again, an increase in energy-loss factors at a given moment during laser action can raise the threshold requirement above the existing degree of inversion in the laser body so as to interrupt or terminate the laser light output at the given moment. Such controlled variation of energy-loss factors is referred to as Q control since it changes the Q or quality factor of the cavity, which is a value directly proportional to the ratio of wave energy storage to wave energy dissipation per wave energy cycle in the cavity.

The modes of propagation in which stimulated emission can occur are also determined by energy-loss factors in the cavity. Individual excited atoms in the laser body may spontaneously emit light in any of a very large number of modes, including modes for plane waves propagating parallel to the long axis of the body and modes for waves propagating at various angles to the latter axis. To the extent that light emitted in any particular mode induces emissive transitions of other upper-level atoms, the induced emission occurs in the same mode. However, significant stimulated emission (providing a laser light output) does not develop in modes for which energy-loss factors in the cavity are high, since light in the latter modes is not reflected repeatedly back and forth through the body but is quickly dissipated (due to such energy-loss factors) before it can induce massive emissive transitions of other atoms. Thus, for example, if energy-loss factors in the cavity are controlled to provide high energy losses for modes for waves propagating at any angle to the laser axis greater than a given angle, the laser light output will be restricted to modes for waves propagating at angles smaller than such given angle. One result of this mode selection is to control the beam spread of the output light; in general, the magnitude of the output beam spread angle is directly related to the magnitude of the aforementioned given angle.

The present invention comprises a resonant laser structure incorporating a laser body in a resonant structure effective to control the laser light by variations of energy-loss factors in the laser resonant cavity. In various embodiments of the invention as described below, the output may be controlled in several ways, for example with respect to initiation and duration (by switching the output on or off), or with respect to beam spread angle, by mode-selective changes in energy-loss factors. While the structure of the invention will be understood to have a variety of applications, it is particularly suitable for enabling modulation of the laser emission by means of Q control so that the laser output light beam may be used to transmit information, for example in communications and data processing systems. Use of laser emissive energy as a carrier wave affords particular advantages, among which are its relatively wide frequency-band characteristics and the extraordinarily high intensity and narrow beam spread of the laser output.

The resonant structure of the present invention, including the laser body, defines a light-propagation path extending between resonant cavity termini. A propagation path portion of the path-defining structure, formed of a first material transmissive to laser emissive light energy (and having for such light energy a refractive index herein designated $n_1$), is engaged externally over a smooth surface area by a second material (herein termed a cladding) also transmissive to such light energy (and having a refractive index herein designated $n_2$). One (or both) of the aforementioned materials exhibits a Kerr or Faraday effect and a change in its refractive index under the influence of an applied electric or magnetic field; specifically, such change in refractive index occurs within a range of indices for which the ratio $n_2/n_1$ varies between a value less than unity and a higher value preferably equal to or greater than unity. The resonant structure is so arranged that light emitted in the laser body and propagating along the path through the first material (which may be an integral portion of the laser body) impinges obliquely on the interface between the latter and the second material.

If the ratio $n_2/n_1$ is less than unity, so that the index of the second material is lower than the index of the propagation path portion formed by the first material, the interface is totally reflective to light propagating through the first material and impinging obliquely on the interface at an angle of incidence greater than a given critical angle $\theta_c$, which is determined by the equation $$\sin \theta_c = \frac{n_2}{n_1}$$

This condition, commonly referred to as total internal reflection, inhibits dissipation of light energy from the resonant structure through the interface, and thereby enables attainment of a low-energy-loss or so-called high-Q condition in the structure, permitting development of laser action. If, however, the ratio $n_2/n_1$ is increased to a value which equals or exceeds unity so that the index $n_2$ of the second material equals or exceeds that of the first material of index $n_1$, the interface no longer has total internal reflection but instead transmits at least a substantial portion of the laser emissive energy impinging thereon, being most fully transmissive when $n_2$ equals $n_1$. The resultant increase in energy losses thus effected in the structure is sufficiently large to prevent or terminate laser action.

Consequently Q control is accomplished in the present invention by means of appropriate field-creating structure arranged for application of the index-changing field to the material (or materials) of variable index. For example, if application of the field increases the value of the ratio $n_2/n_1$, control of the initiation and duration of the laser light output involves energizing the field-creating structure to apply a field effective to increase such ratio to a value at least equal to unity when it is desired to interrupt laser action, and deenergizing the latter structure to remove the field when it is desired to permit laser action. Since the response time of the Kerr or Faraday cladding material to the application of the field is very short, the control effect is concomitantly rapid, facilitating pulse or other high frequency modulation of the laser output by control of energization of the field creating structure by a signal representative of information to be transmitted.

With an appropriate arrangement of elements, mode-selective variation in energy-loss factors providing control of the laser output beam spread angle may similarly be effected by varying the ratio $n_2/n_1$ in the foregoing manner within the range of values below unity. For instance, the structure of the invention may be designed so that the angle formed between any given direction of light propagation and the laser axis is complementary to the incident angle of such direction at the aforementioned interface. In this case, there is total internal reflection at the interface only for light diverging from the laser axis at an angle smaller than the complement $\phi_c$ of the critical incident angle $\theta_c$, because such total internal reflection exists only for light striking the interface at an incident angle greater than $\theta_c$. Hence there is a high-loss condition at the interface, preventing significant development of stimulated emission in the laser body, for modes for waves propagating at an angle to the laser axis greater than $\phi_c$. The beam spread angle of the laser output is then directly dependent on the magnitude of the angle $\phi_c$; and since the latter angle is decreased with increase of the magnitude of the angle $\theta_c$, an increase in the value of the ratio $n_2/n_1$, by increasing the magnitude of $\theta_c$, concomitantly reduces the output beam spread angle.

Further features and advantages of the invention will be apparent from the detailed description hereinbelow set forth, together with the accompanying drawings, wherein.

Figure 1:
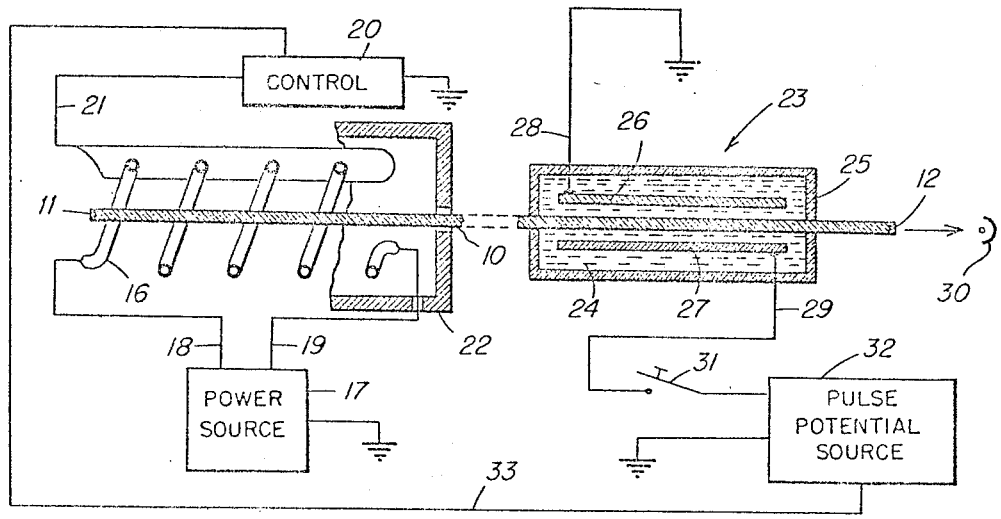
FIG. 1 is a schematic sectional view of a laser structure embodying the present invention in a particular form.

Referring first to FIG. 1, the resonant structure of the device there shown is provided by an elongated laser element or fiber 10, comprising a body of solid laser material of elongated, smooth-sided configuration (as in the form of an optical fiber) having internally reflective cavity-terminating end faces. An optical fiber is a fiber-shaped body of light-transmissive material providing an elongated light propagation path of relatively small cross-sectional area. The boundaries of the path are established at the smooth, elongated peripheral surface of the fiber, which is ordinarily surrounded by material (such as air or a suitable cladding) having a refractive index lower than that of the fiber material to provide total internal reflection at the interface; light propagating through the fiber impinges obliquely on this boundary surface and is successively reflected from side to side of the fiber by the latter surface. Hence, in a fiber laser, attainment of a high Q condition is dependent on such total internal reflection, which minimizes dissipation of laser emissive energy through the fiber side walls and concentrates the energy in the fiber. Q control for such a structure may therefore be provided, in accordance with the present invention, by cladding a preselected length of the fiber boundary surface with a suitable Kerr or Faraday material, to vary the internal reflectivity of such surface portion in the manner described above.

The element or fiber 10 of FIG. 1 is an unclad fiber laser core of typically thin, elongate cylindrical configuration, fabricated of a suitable solid laser material such as neodyminum-doped glass, with side wall surfaces exposed to the air. The plane, axially perpendicular, opposed end surfaces 11, 12 of the fiber are polished and may be provided with vacuum-evaporation deposited silver coatings (as shown) so that these end faces constitute internally reflective termini of a resonant cavity coextensive with the fiber. The coating on the end face 12 is made partially light-transmissive, to permit emission of the laser light output therethrough. If the fiber is sufficiently long the end coatings may be dispensed with, since in a long fiber laser the partial internal reflectivity (typically about 5%) exhibited by uncoated but polished end faces is adequate to define the resonant cavity. In the latter case, a laser light output will be emitted through both ends of the fiber.

The fiber 10 is surrounded concentrically, along a first portion of its length, by a helical gaseous discharge flash tube 16 of a type conventionally employed to provide pumping light energy for solid-state lasers. The flash tube, energized from a conventional power source 17 connected to the end electrodes of the tube through leads 18, 19, is adapted to emit a pulse of light including light in at least one absorption band of the laser material. The light-producing discharge in the tube 16 is initiated, when sufficient charge energy has been developed in the power source, by applying an electrical pulse from a control source 20 to a trigger electrode 21 which encircles the turns of the flash tube in proximate relation thereto. A hollow, internally reflective shield 22 encloses the flash tube and the portion of the fiber 10 surrounded by the tube to contain the pumping light pulse energy emitted by the flash tube and concentrate this light onto the fiber surface.

It will be understood that the foregoing structures are elements of a conventional unclad fiber laser structure and are adapted to function as such to produce laser output pulses of intense coherent light. Thus, when a pumping light pulse from the flash tube is initiated as described above, this pumping light enters the fiber 10 and excites active atoms of the laser material causing them to shift to the upper energy level required for laser action. Assuming for the moment that this provides a degree of inversion in the fiber greater than the threshold value, reflection of spontaneously emitted light through the laser cavity then stimulates development of a large bidirectionally reflected pulse of coherent light (by inducing emissive transitions of upper-level atoms) to initiate a laser output light pulse emerging through the fiber end face 12 and continuing until the depletion of the enlarged upper level population by such transitions reduces the degree of inversion again below the threshold value.

To provide Q control, the device of FIG. 1 further includes a cladding structure, generally designated 23, surrounding the fiber 10 along a second portion of the fiber length (external to the shield 22). This cladding structure comprises a body of liquid Kerr material 24 confined by a capsule 25 and in which the second fiber portion is immersed. The Kerr material employed is a liquid which exhibits a Kerr effect upon application of an electric field, with concomitant change in refractive index proportional to the square of the strength of the applied field. Examples of suitable Kerr materials for use as the cladding 23 are nitrobenzene and carbon disulfide.

For application of the requisite electric field to the Kerr material 24, a pair of condenser plates 26, 27 are positioned in the body of liquid 24, parallel to the long axis of the fiber and in spaced relation to the fiber on opposite sides thereof. These plates are electrically energized through leads 28, 29 extending externally of the capsule 25.

When the plates 26, 27 are not energized, the liquid cladding material 24 has a refractive index lower than that of the fiber 10 to provide total internal reflection at the fiber-liquid interface for light emitted by the first laser portion. The side walls of the fiber portions external to the cladding 23, being exposed to the air (which also has a refractive index lower than that of the fiber), also have total internal reflection for the laser emitted light. Consequently, throughout the length of the fiber, energy losses at the side walls are minimized. Light emitted by transitions of upper-level atoms in the laser fiber and impinging on these side walls at greater than a critical angle of incidence $\theta_c$ is concentrated in the fiber rather than being dissipated by transmission through the walls. Under these low-energy-loss conditions laser action can readily develop in the fiber in the manner described above.

Energization of the plates 26, 27, however, creates an electric field producing a Kerr effect in the liquid 24 between the plates (immediately adjacent the fiber side walls). With the application of the field, the index of refraction of the Kerr material increases (at a square-law rate of change with respect to the voltage of the applied field) for the electric light vector parallel to the electric field, and decreases (again at a square-law rate) for the electric light vector perpendicular to the electric field. In particular, when a sufficiently strong field is applied, the index for parallel-electric-vector light increases to a value which is equal to or greater than the refractive index of the fiber material. This means that the electric light vector in the fiber which is parallel to the electric field is no longer totally reflected at the fiber-cladding interface, but is partially transmitted therethrough. The electric light vector perpendicular to the field is totally reflected; however, as this light undergoes subsequent reflections, it becomes elliptically polarized, with the result that during subsequent reflections, a portion of the light is polarized parallel to the direction of the field and hence is not totally reflected. Therefore, each time the light reflects from the internal surface of the fiber, its state of polarization is changed and a portion of the light leaves the fiber, so that after a plurality of reflections most of the light will have left the fiber. In other words, application of a sufficiently strong field lowers the Q condition of the laser resonant cavity and correspondingly increases the laser threshold of the structure, since the increased side wall light losses increase the magnitude of the totality of energy-loss factors in the cavity.

In the foregoing system, any application of a sufficiently strong electric field to the liquid 24 from the start of the pumping period serves to prevent initiation of laser action. Removal of the field by deenergization of the plates 26, 27 at a given moment during the pumping period (after establishment of the requisite degree of inversion for laser action) enables rapid development of a laser light pulse at such time. Again, application of a sufficiently strong field to the liquid cladding at a given moment during laser action abruptly terminates such action, interrupting the laser light output. In this manner, the initiation and duration of the light output from the fiber can be controlled by energization and de-energization of the plates 26, 27. Such control is very rapid, since the response time of the Kerr material to energization of the plates is of the order of $10^{-9}$ seconds or less, whereas a single laser output pulse (corresponding to one pumping light pulse) may ordinarily endure, for example, as long as $10^{-4}$ seconds or longer.

The magnitude of the output beam spread angle may also be varied, in the structure of FIG. 1, by controlled energization of the plates 26, 27 to change the refractive index of the Kerr material 24 (for light polarized parallel to the applied field) within a range of values below the refractive index of the fiber material. Since the fiber-cladding interface is parallel to the axis of the fiber 10, the angle made by any direction of light propagation with the fiber axis is complementary to the incident angle of such direction at the interface, enabling mode-selective Q control. Specifically, at any given value of refractive index of the Kerr material less than the fiber index, the interface has total internal reflection for parallel-electric-vector light only in modes for waves propagating at an angle to the laser axis which is less than the complement $\phi_c$ of the critical incident angle $\theta_c$. As a result the cavity is in high Q condition only for the latter modes; and when the Kerr material index for parallel-electric-vector light is raised by increase in the voltage of the applied field, concomitantly augmenting the value of $\theta_c$, the output beam spread angle (which is dependent on $\phi_c$) is correspondingly reduced. In other words the magnitude of the beam spread angle decreases with increase of the voltage of the applied field.

Various arrangements for controlling energization of the plates 32, 33, to modulate the laser light output with respect to pulse duration, beam spread angle, or otherwise, by a signal representative of information, will be apparent to those skilled in the art. Thus, for example, the plates may be intermittently energized and deenergized with the aid of appropriate signal circuitry to provide output pulses of duration controlled to represent the information to be sent. This modulated laser output may be received for demodulation by a conventional detector, as schematically represented by a photosensitive element 30.

By way of example of a suitable control arrangement for the Kerr cell 23, the plates may be energized through a manually operable switch 31 from a source of pulse potential 32 which is controlled through a control circuit 33 to generate a potential pulse in preselected time relationship to each trigger pulse generated by the control source 20 and used to energize the trigger electrode 21.

Figure 2:
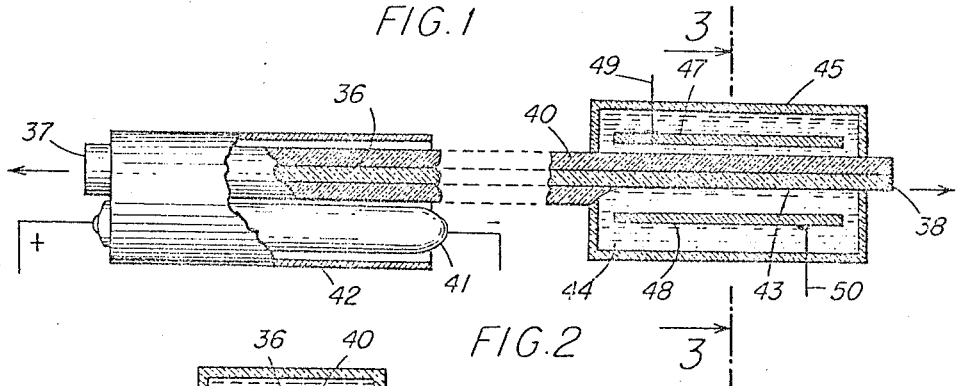
FIG. 2 is a schematic view, partly in section, of an alternative arrangement for the structure of FIG. 1 including a modified form of fiber laser structure.

The modified structure of FIG. 2 includes a laser element or fiber 36, fabricated as before of a suitable solid laser material, and shown as having uncoated, polished end faces 37, 38 which are sufficiently reflective to constitute resonant cavity termini for this elongate element or fiber. The element or fiber 36 is enclosed for most of its length in a glass cladding 40, which has a refractive index lower than the fiber index so that the walls of the fiber contiguous to the cladding have total internal reflection for the laser emissive light. This cladding 40 is also frequently desirable to provide adequate mechanical strength for the fiber, since the fiber laser core 36 may often be of very small cross-sectional diameter and comparatively great length. A flash tube 41 (corresponding to the tube 16 of FIG. 1, but shown for exemplary purposes as a linear rather than a helical light source) is positioned in proximate parallel relation to a first portion of the fiber and the cladding 40 which aids in concentrating pumping light from the flash tube into the fiber core 36), and is arranged to provide pumping energy to the fiber, the power source and trigger instrumentalities being omitted from FIG. 2 for simplicity of illustration. An internally reflective metallic sleeve 42, corresponding to the shield 25 of FIG. 1, closely surrounds the tube 41 and the first portion of the fiber and cladding.

Figure 3:
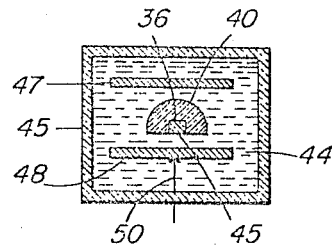
FIG. 3 is a sectional view taken along the plane 3—3 of FIG. 2.

In the device of FIG. 2, the cladding 40 is polished down or etched away at a second portion of the fiber to expose a surface or side wall 43 of the fiber (as further shown in FIG. 3) for a substantial length. The latter portion of the fiber is immersed in a liquid Kerr material 44 having the same characteristics and properties as the liquid 24 of FIG. 1. This liquid is contained in a capsule 45. A pair of spaced condenser plates 47, 48 (analogous to the plates 26, 27 of FIG. 1) are positioned in the liquid 44 on opposite sides of the fiber 36 and parallel to the fiber axis, for application of an electric field to the liquid. As shown more particularly in FIG. 3, these plates are arranged so that the exposed fiber surface 43 lies in a plane perpendicular to the field created between the plates. The plates are electrically energized through respective leads 49, 50 extending externally of the capsule 45, the Kerr cell energizing and control instrumentalities being omitted for simplicity of illustration.

The arrangement of plates and Kerr liquid in the structure of FIG. 2 functions in the same manner as that in the device of FIG. 1 to control laser action in the fiber 36. Specifically, energization of the plates, by raising the refractive index of the liquid for the laser emissive energy electric vector parallel to the electric field between the plates, renders the fiber surface 42 more light-transmissive, increasing the energy losses in the laser resonant cavity sufficiently to prevent or interrupt laser action.

Figure 4:
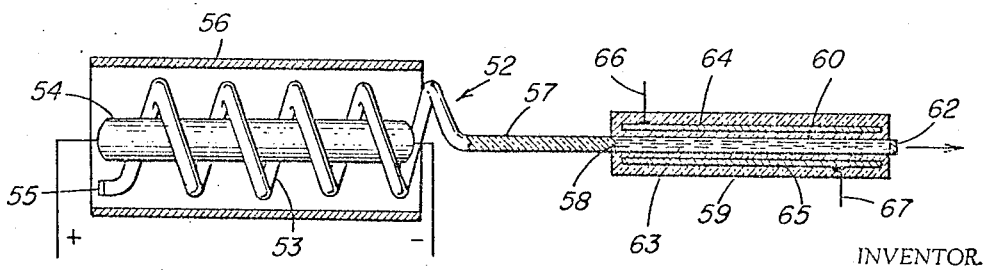
FIG. 4 is a schematic sectional view of another embodiment of the invention.

Referring now to FIG. 4, the alternative embodiment there shown includes an unclad laser element or fiber 52 which has a first portion 53 shaped in the form of a helix to surround a linear flash tube 54. The end surface 55 of the element or fiber 52 at such first portion is reflectively coated to provide a first resonant cavity terminus. An internally reflective shield 56 surrounds the flash tube and the helical portion of the fiber laser to concentrate light from the flash tube on the fiber. As before, the flash tube is associated with appropriate power source and trigger instrumentalities (not shown) to provide an input pulse of pumping light for the fiber laser effective to produce a laser light output pulse.

As will be understood by those skilled in the art, due to the so-called "light-pipe" action of an optical fiber body the helical portion 53 of the fiber laser 52 is equivalent to an axially rectilinear fiber in defining a resonant wave-energy propagation path bounded at the unclad side wall of the fiber, which is exposed to the air and thus has total internal reflection. More generally, it will be understood that the several flash tube-fiber arrangements of FIGS. 1, 2 and 4 are, for purposes of the present invention, equivalent to each other and are thus interchangeable in the devices of those figures, being shown as exemplary of conventional flash tube-fiber laser arrangements which may be employed in the described embodiments of the present invention.

At its second end, the fiber laser 52 of FIG. 4 terminates in an axially rectilinear portion 57 having a plane, uncoated end face 58. The structure of FIG. 4 further includes a cylindrical hollow cladding 59 formed of a suitable glass or like material of given refractive index for laser emissive light energy, and having an axially disposed cylindrical passage 60 of diameter substantially equal to the diameter of the fiber laser 52. This cladding 59 is disposed that one end of the passage 60 is closed by the fiber end 58, with the passage positioned in coaxial relation to the fiber portion 57. The other end of the passage is closed by a partially reflective thin body 62. The passage 60 is filled with a suitable liquid Kerr material 63 (of the type described above in connection with the structure of FIG. 1), and spaced capacitor plates 64, 65 (respectively energized through leads 66, 67) are embedded in the member 59 on opposite sides of the passage 60 to provide an electric field effective to produce a Kerr effect in the material 63; the energizing and control instrumentalities for these plates are again omitted for simplicity of illustration.

With this arrangement of elements, the resonant propagation path of the cavity structure extends between the fiber end face 55 and the partially reflective thin body 62; thus the body of Kerr material 63 constitutes a core portion of the path-defining structure, having the configuration and path-defining characteristics of an optical fiber. Except when under the influence of an electric field, this core portion of liquid Kerr material has a refractive index higher than that of the surrounding glass cladding 59, providing total internal reflection in the cavity at the interface between the liquid core and the latter cladding, so that the cavity is in high-Q condition. When an electric field is applied to the Kerr material by energization of the plates 64, 65, however, the refractive index of the Kerr material decreases for the laser light energy electric vector perpendicular to the field, until (at a sufficiently high field voltage) such index becomes equal to or less than the refractive index of the surrounding cladding. Total internal reflection then no longer exists at the interface for the perpendicular electric-vector light component, with the result that energy losses in the cavity are increased sufficiently to prevent or terminate laser action.

Thus the structure of FIG. 4 operates in essentially the same manner as those of FIGS. 1 and 2 to provide controlled initiation and duration of laser output pulses or to vary the output beam spread angle, except that in the FIG. 4 device the core index rather than the cladding index is varied by application of the electric field. In each of these devices the Kerr material exhibits the same index-changing response to the field, but whereas the devices of FIGS. 1 and 2 are arranged to utilize the increase in index thus effected for the parallel-electric-vector light component, the device of FIG. 4 employs the concomitant decrease in index for the perpendicular electric-vector light component, to effect the desired controlled variation in the Q condition of the cavity.

The arrangement of FIG. 4 is susceptible of various modifications. For example, the core portion represented by liquid 63 may be a laserable material (and hence an integral portion of the fiber laser 52) which exhibits an electrically controlled field-responsive variation in refractive index. Again, a device structurally analogous to that shown in FIG. 4 may be constructed in which both the core portion 63 and the cladding 59 exhibit a field-responsive change in refractive index. In such case, the core material is selected to have a refractive index higher than that of the cladding material when the field is not applied, providing total internal reflection at the core-cladding interface. Upon application of the field, the refractive index of the core material decreases for one electric light vector, and the index of the cladding material increases for an electric light vector, until at a sufficiently high field voltage the latter index becomes equal to or greater than the former, providing increased light transmission through the core-cladding interface and thus increasing energy losses in the cavity to prevent or terminate laser action.

The several embodiments of the invention described above and shown in FIGS. 1–4 rely on fiber optic configurations to provide a surface at which energy losses in the resonant cavity can be varied to control the laser output. That is to say, the changes in core-cladding interface reflectivity produced in the foregoing structures are effective to alter the Q condition of the cavity because of the fact that in an optical fiber the side surface of the fiber provides a path-defining boundary (on which light propagating through the fiber is obliquely incident) and must therefore have total internal reflection to enable attainment of a high-Q condition in the cavity. The same result may be obtained, however, with other optical configurations, as exemplified by the structures illustrated in FIGS. 5 and 6.

Figure 5:
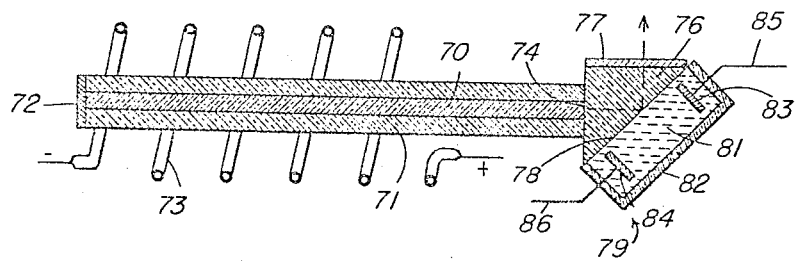
FIG. 5 is a schematic sectional view of a further alternative embodiment of the invention.

The structure of FIG. 5 includes a laser element or fiber 70 (shown as enclosed longitudinally in a glass cladding 71 of refractive index lower than the index of the fiber laser material) having a reflectively coated end face 72 and a surrounding helical flash tube 73 to provide pumping light energy. As before, the supplementary elements shown as associated with the flash tube in FIG. 1 are omitted for simplicity of illustration.

In this embodiment the second end face 74 of the laser body is not reflectively coated but is instead positioned to abut one face of a 45° prism 76 which is formed of glass having a given refractive index for laser emissive light energy. A second face of the prism 76 is made internally reflective, as with a partially light-transmissive silver coating 77. Consequently, in this embodiment, the resonant cavity structure extends between the laser end face 72 and the latter prism coating. Light emitted in the fiber laser 70 is reflected between the end face 72 and the coating 77 by a diagonal plane surface 78 of the prism, the propagation path of light in the resonant cavity thus having a 90° bend at the diagonal prism surface.

Q control for this structure is provided by a Kerr cell generally designated 79, including a body of liquid Kerr material 81 intimately engaging the diagonal prism surface 78 and contained in a suitable capsule 82. The Kerr material used is selected to have an index of refraction for laser emissive light energy that is normally lower than the refractive index of the prism glass (by an amount providing total internal reflection for the laser light incident on the surface 78 at a 45° angle), and that can be increased by application of an electric field. To create such field, the Kerr cell further includes a pair of spaced capacitor plates 83, 84 shown diagrammatically as immersed in the liquid Kerr material 81 and electrically energized through leads respectively designated 85, 86, by appropriate energizing and control instrumentalities (not shown).

When the plates 83, 84 are not energized, the diagonal prism surface 78 is essentially totally reflective to light emitted in the fiber laser 70 and directed to the surface 78 at an incident angle of approximately 45°. Accordingly, the resonant cavity structure is then in high Q condition. Light can reflect back and forth between the end face 72 and the coating 77, and hence laser action can develop (upon pumping of the laser body 70) to produce one or a succession of laser output pulses emitted through the partially transmissive prism coating 77.

Energization of the plates, however, creates an electric field effective to raise the refractive index of the Kerr material 81, and thus to increase the critical angle of incidence for total internal reflection at the prism surface 78. In particular, when the Kerr material index $n_2$ is raised to a value (relative to the index $n_1$ of the prism glass) such that $$\frac{n_2}{n_1} > \sin 45°$$

the surface 78 no longer has total internal reflection for the laser light impinging thereon at an incident angle of 45°, but permits a substantial proportion of such light to pass through the surface and out of the resonant structure. The energy-loss factors in the structure are thereby increased sufficiently to create a low Q condition effective to terminate or prevent laser action.

That is to say, in the structure of FIG. 5 it is not necessary that the index $n_2$ equal or exceed the index $n_1$ to interrupt or prevent laser action, but only that the index $n_2$ increase to the aforementioned value. It will be appreciated, moreover, that the 45° incident angle referred to above is exemplary only, and that (for example) the prism 76 may be shaped so that the laser light from the fiber 70 impinges on the diagonal prism surface 78 at some other oblique incident angle. In a more general sense, then, for any given value of the latter angle, laser action can be switched off in the FIG. 5 device by raising the Kerr material index $n_2$ to a value at which the ratio $n_2/n_1$ exceeds the value of the sine of such angle.

As will now be understood, Q control is effected in the embodiment of FIG. 5, as in the embodiments of FIGS. 1–4, by means of an electrically controlled field effective to vary the refractive index of a cladding material and thereby to vary the internal reflectivity of a clad side surface portion (or light propagation path boundary) of the resonant cavity structure intermediate the cavity termini. In function, the device of FIG. 5 is essentially similar to the foregoing embodiments. It will be appreciated, however, that use of a fiber laser is not essential to the Q-control function of the FIG. 5 device; that is to say, the laser included in the structure there shown may be either of the fiber form or of the conventional comparatively large-diameter rod form.

Figure 6:
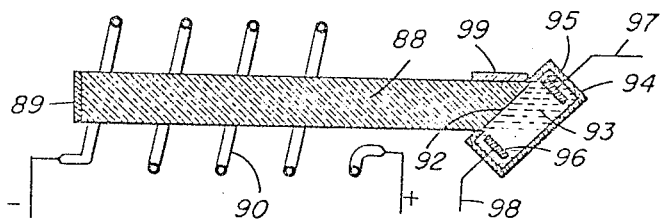
FIG. 6 is a schematic sectional view of a modified form of the structure of FIG. 5.

A modification of the FIG. 5 device, in which the fiber laser 70 is replaced with a conventional laser rod, is shown in FIG. 6. As there illustrated, the laser rod (designated 88), formed of a suitable solid laser material, has a plane, reflectively coated end face 89 and is surrounded by a helical flash tube 90 analogous to the flash tube 73 of FIG. 5 in arrangement and function. The second end of the rod 88 is bevelled to provide a plane uncoated surface 92 at an angle of (for example) 45° to the axis of the rod. Intimately engaging the latter surface is a body of liquid Kerr material 93, contained in a capsule 94. Capacitor plates 95, 96, respectively energized through leads 97, 98, are shown diagrammatically as spaced within the capsule 94 to apply an electric field to the Kerr material 93. The latter material has a refractive index (again designated $n_2$) lower than the index $n_1$ of the laser rod material when the field is not applied, by an amount providing total internal reflection at the surface 92 for light propagating through the rod 88 and impinging on the latter surface at a 45° angle; such light is then reflected by the surface 92 between the end face 89 and a plane, partially transmissive reflective coating 99 deposited on a plane-polished side surface of the rod 88 adjacent the surface 92, and thus the cavity is in high Q condition, enabling development of a laser output light pulse emitted through the coating 99.

Upon application of an electric field to the Kerr material 93, the refractive index of the latter material is raised (as in the structure of FIG. 5) to a value at which the ratio $n_2/n_1$ exceeds the sine of the incident angle of the laser light on the surface 92 (in this case, again, 45°). The surface 92 then no longer has total internal reflection for such light, with the result that energy losses in the cavity are increased sufficiently to prevent or terminate laser action. Thus the device of FIG. 6 is essentially similar in structure and operation to that of FIG. 5, except that the prism 76 of FIG. 5 is omitted and an integral portion of the rod 88 (that portion including the bevelled end surface 92 and bearing the reflective coating 99) is arranged to serve the same function as the prism.

The material of variable index included in the structures of FIGS. 1–6 as a Kerr material may alternatively be provided by a suitable Faraday material (a material that exhibits a Faraday effect and a change in refractive index upon application of a magnetic field). By way of example, in FIG. 7 there is shown a modified form of the structure of FIG. 1 incorporating a body of Faraday material in place of the Kerr material 24 as the cladding for the second portion of the laser element or fiber.

Figure 7:
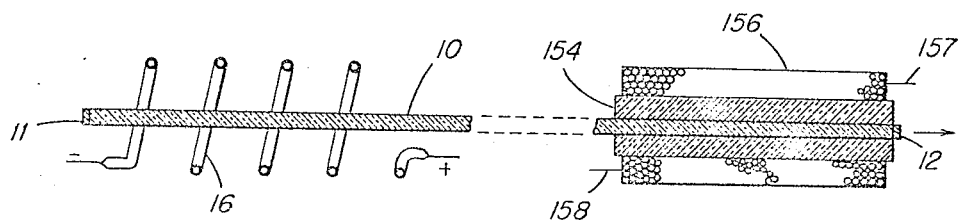
FIG. 7 is a schematic sectional view of another embodiment of the invention.

Thus the embodiment of FIG. 7 includes the unclad laser element or fiber 10 of FIG. 1 with internally reflective end faces 11, 12 and flash tube 16 arranged as in FIG. 1 to constitute a conventional fiber laser structure, certain supplementary elements of FIG. 1 being again omitted for simplicity of illustration. For the structure of FIG. 7, a portion of the element or fiber 10 is clad with a body of solid Faraday material 154 to provide Q control operation.

Specifically, the material 154 is selected to exhibit a large Faraday effect upon application of a magnetic field, and to undergo an accompanying change in refractive index. A number of types of glasses have high Faraday effects at low temperatures, one suitable material being cerium phosphate glass. To provide the low temperature conditions required for achievement of the desired Faraday effect with such material, the fiber and cladding 154 may be cooled by appropriate conventional cooling means (not shown).

As illustrated, the cladding 154 is surrounded by a multi-turn, multi-layer inductor coil 156, energized through leads 157, 158, by appropriate energizing and control instrumentalities (not shown), to create the aforementioned magnetic field. The Faraday cell thus constituted by this coil and the cladding 154 functions in much the same way as the Kerr cell of FIG. 1 to effect Q control. In the absence of the magnetic field, the refractive index of the cladding is lower than that of the fiber laser material and hence the fiber side walls have total internal reflection throughout the length of the fiber for laser emitted light. Application of the magnetic field to the cladding 154 by energization of the coil 156 produces a Faraday effect in the cladding; this Faraday effect results in rotation of the plane of polarization of light passing through the Faraday material. Concomitantly, the refractive index of the material increases (as a linear function of the applied field strength) for one electric light vector and decreases (again as a linear function of the applied field strength) for another. If the field strength is sufficiently high, the increasing index at least equals the index of the fiber laser material, so that the fiber-cladding interface no longer has total internal reflection for the first-mentioned laser emissive energy electric vector. This decreases the resonant Q over the clad portion of the fiber walls sufficiently to prevent or terminate laser action. In such manner the initiation and duration of the laser light output are controlled by controlling energization of the coil 156.

While the foregoing embodiments of the invention have been described with reference to conventional pulsed laser operation, the invention may also be employed for laser output control or modulation in so-called continuous laser operation, wherein the laser body is maintained continuously at a degree of inversion greater than threshold by a continuous input of intense pumping energy. Thus, for example, by application of an electric or magnetic field to a respective Kerr or Faraday cladding of a continuously pumped fiber laser, the otherwise continuous creation of laser light output can be initiated and interrupted to provide light output pulses of controlled duration, controlled time sequence, and controlled amplitude thus to enable transmission of information.

It is to be understood that the invention is not limited to the specific features and embodiments hereinabove set forth, but may be carried out in other ways without departure from its spirit.

I claim:

1. A laser structure comprising, in combination, means providing a resonant wave-energy propagation path, said means including an active laser element having a propagation path portion formed of a first material transmissive to laser emissive light energy with a smooth surface area against which laser emissive light energy propagating through said portion in said path impinges at an oblique angle; a body of a second material transmissive to said light energy intimately engaging said smooth surface area of said propagation path portion; at least one of said first and second materials exhibiting for an electric-field component of said light energy an electrically controlled field-responsive variation in refractive index within a range of values including a value at which the ratio of the refractive index of said second material to the refractive index of said first material for said light energy is less than unity; and means electrically energizable to apply thereto a field effective to vary said refractive index of said one of said materials within said range of values to control the Q condition of said element.

2. A laser structure comprising, in combination, an elongated and smooth-sided fiber laser element formed of a material having a given refractive index for laser emissive light energy and clad with material of lower refractive index for said light energy except for a length providing an exposed unclad side surface portion, means for energizing said element to establish a laserable inversion of energy states thereof, a confined body of liquid material intimately engaging said exposed side portion of said element and exhibiting a Kerr effect with corresponding variation in refractive index for an electric-field component of said light energy between lower and upper values respectively below and at least equal to the refractive index of said element, and a pair of condenser plates immersed in said liquid material in spaced parallel relation to said element on opposite sides thereof and energizable to apply to said liquid material an electric-field effective to change the refractive index of said liquid material between said lower and said upper value thereof.

3. The invention according to claim 1 wherein said second material intimately engages a side surface area of said propagation path portion and exhibits a Kerr effect with corresponding variation in its refractive index.

4. The invention according to claim 1 wherein said first material exhibits an electrically controlled field-responsive variation in refractive index.

5. The invention according to claim 1 wherein a prism formed of said first material provides a segment of said first path portion, with said prism comprising said surface, and wherein said second material exhibits said electrically controlled field-responsive variation in refractive index within said range and specifically between a value below the sine of said oblique angle and a value above the sine of said oblique angle.

6. The invention according to claim 1 wherein said field is a magnetic field.

References Cited by the Examiner

UNITED STATES PATENTS 3,208,342  9/1965  Nethercot _____ 88—61

FOREIGN PATENTS 674,294  4/1939  Germany.

JEWELL H. PEDERSEN, *Primary Examiner.*

RONALD L. WIBERT, *Examiner.*